US012662722B2

(12) United States Patent
Barbier et al.

(10) Patent No.: US 12,662,722 B2
(45) Date of Patent: Jun. 23, 2026

(54) BATTERY TRAY BOTTOM FOR ELECTRIC VEHICLES

(71) Applicant: CONSTELLIUM NEUF-BRISACH, Biesheim (FR)

(72) Inventors: David Barbier, Grenoble (FR); Jocelyne List, Saint Egreve (FR); Jean-Philippe Masse, Grenoble (FR)

(73) Assignee: CONSTELLIUM NEUF-BRISACH, Biesheim (FR)

( * ) Notice: Subject to any disclaimer, the term of this patent is extended or adjusted under 35 U.S.C. 154(b) by 543 days.

(21) Appl. No.: 18/246,042

(22) PCT Filed: Sep. 22, 2021

(86) PCT No.: PCT/FR2021/051628
§ 371 (c)(1),
(2) Date: Mar. 21, 2023

(87) PCT Pub. No.: WO2022/064140
PCT Pub. Date: Mar. 31, 2022

(65) Prior Publication Data
US 2023/0357900 A1 Nov. 9, 2023

(30) Foreign Application Priority Data

Sep. 23, 2020 (FR) ........................................ 2009649
May 11, 2021 (FR) ........................................ 2104966

(51) Int. Cl.
*C22C 21/02* (2006.01)
*C21D 8/0221* (2026.01)
(Continued)

(52) U.S. Cl.
CPC ............ *C22C 21/02* (2013.01); *C21D 8/0226* (2013.01); *C21D 8/0236* (2013.01);
(Continued)

(58) Field of Classification Search
CPC ................ C21D 8/0226; C21D 8/0236; C21D 8/0278; C21D 9/46; C22C 21/02; C22C 21/04; H01M 50/224
See application file for complete search history.

(56) References Cited

U.S. PATENT DOCUMENTS 9,725,792 B2 8/2017 Park et al.
11,459,641 B2 10/2022 Ratchev et al.
(Continued)

FOREIGN PATENT DOCUMENTS

CN 106207044 A 12/2016
CN 205930892 U 2/2017
(Continued)

OTHER PUBLICATIONS

Aluminum 4032-T6. MatWeb. Automation Creations, Inc. 3 pages. https://asia.matweb.com/search/SpecificMaterialPrint.asp?bassnum= ma4032t6 (Year: 1996).*
(Continued)

*Primary Examiner* — Tima M. Mcguthry-Banks
(74) *Attorney, Agent, or Firm* — McBee Moore & Vanik IP, LLC

(57) ABSTRACT

The invention relates to battery trays for electric or hybrid vehicles. The bottoms of the battery trays are made of a thin sheet of aluminum alloy having a modulus of elasticity higher than 77 GPa in order to optimize thickness thereof while ensuring resistance to intrusion. The invention also relates to a thin sheet of 4xxx series aluminum alloy whose modulus is higher than 77 GPa and whose yield strength $Rp$ 0.2 is higher than 295 MPa.

20 Claims, 3 Drawing Sheets

(51) Int. Cl.
    *C21D 8/0278*      (2026.01)
    *C21D 9/46*        (2006.01)
    *C22C 21/04*      (2006.01)
    *H01M 50/224*    (2021.01)

(52) U.S. Cl.
    CPC ............. *C21D 8/0278* (2013.01); *C21D 9/46*
        (2013.01); *C22C 21/04* (2013.01); *H01M*
        *50/224* (2021.01); *H01M 2220/20* (2013.01)

(56)                References Cited

U.S. PATENT DOCUMENTS

| | | | |
|---|---|---|---|
| 2007/0141451 A1 | 6/2007 | Marukawa et al. | |
| 2008/0173488 A1 | 7/2008 | Takasaki | |
| 2009/0236162 A1 | 9/2009 | Takasaki et al. | |
| 2018/0347016 A1* | 12/2018 | Ratchev | C22F 1/043 |
| 2024/0408951 A1* | 12/2024 | Schüddekopf | H01M 50/247 |
| 2025/0233246 A1* | 7/2025 | Czorny | H01M 50/249 |

FOREIGN PATENT DOCUMENTS

| | | |
|---|---|---|
| CN | 107201464 A | 9/2017 |
| CN | 107760162 A | 3/2018 |
| CN | 108342627 A | 7/2018 |
| EP | 1939026 A1 | 7/2008 |
| EP | 2623353 B1 | 8/2013 |
| EP | 2766247 B1 | 8/2014 |
| EP | 3384060 A1 | 10/2018 |
| FR | 2721041 A1 | 12/1995 |
| WO | 2017/093627 A1 | 6/2017 |

OTHER PUBLICATIONS

Aluminum Alloy Designation. The Trident Company. 2 pages. https://www.trident-metals.com/wp-content/uploads/2015/01/Aluminum-Alloy-Designations.pdf (Year: 2015).*

4032 Aluminum Flat Stock List. Eagle Alloys. One page. https://www.eaglealloys.com/wp-content/uploads/2021/03/EagleAlloys4032AluminumFlatStockList.pdf (Year: 2017).*

EN AW-4032—The Wear-Resistant Alloy. EGA Leichtmetall. 2 pages. https://www.leichtmetall.eu/media/pexefjzb/en-aw-4032-eng.pdf. (Year: 2024).*

International Search Report issued in PCT/FR2021/051628 (Mar. 31, 2022).

\* cited by examiner

[Fig. 1]
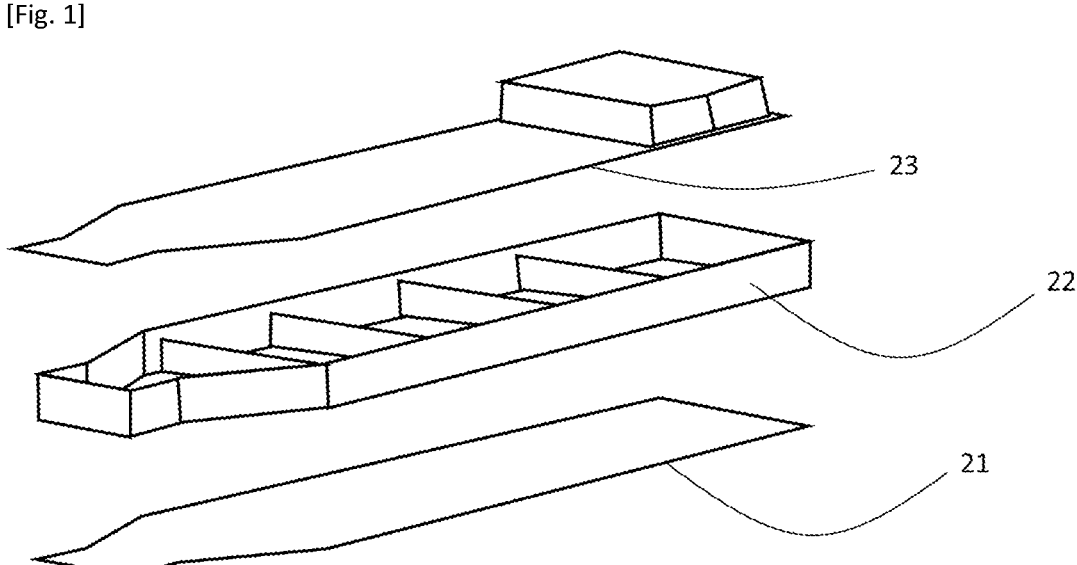
[Fig. 2]
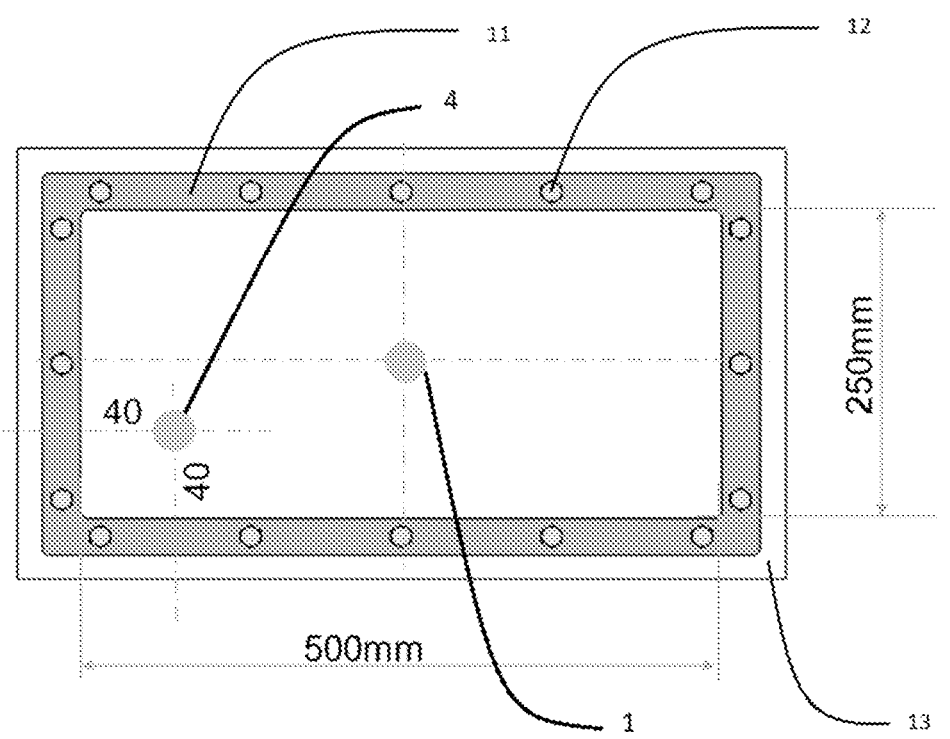

[Fig. 3]
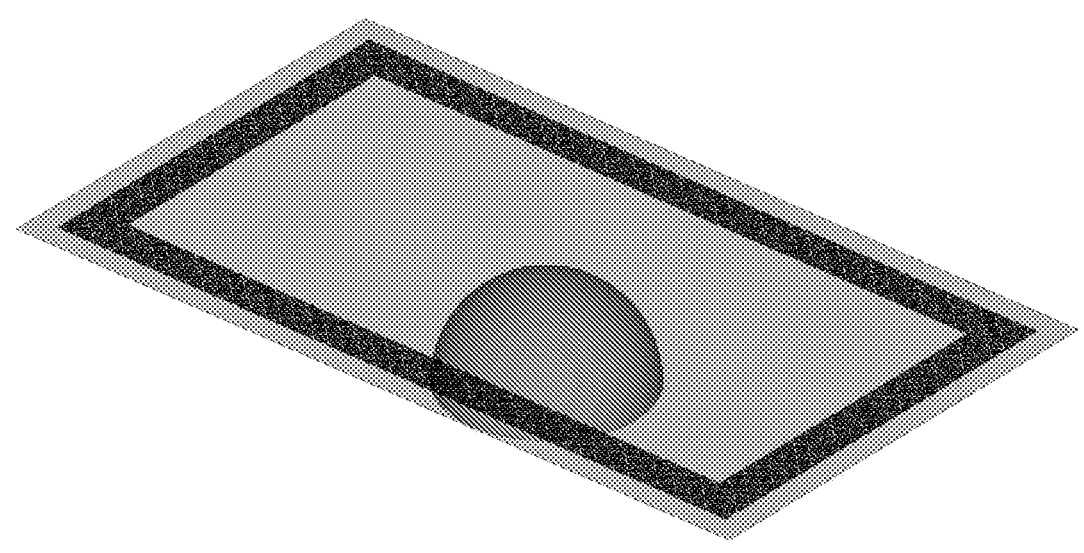
[Fig. 4]
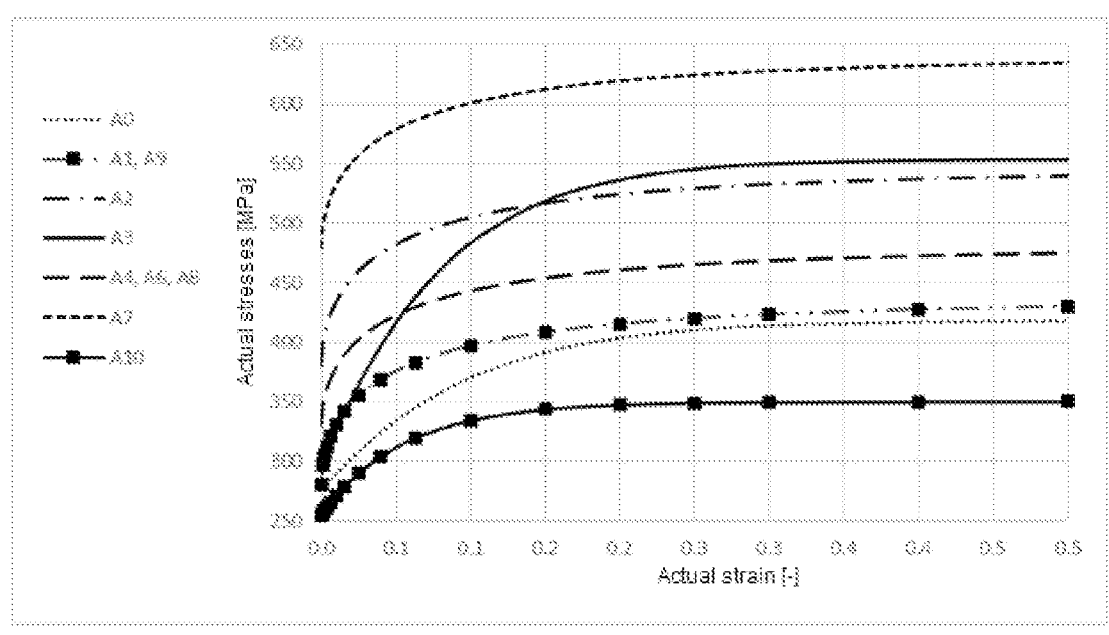

[Fig. 5]
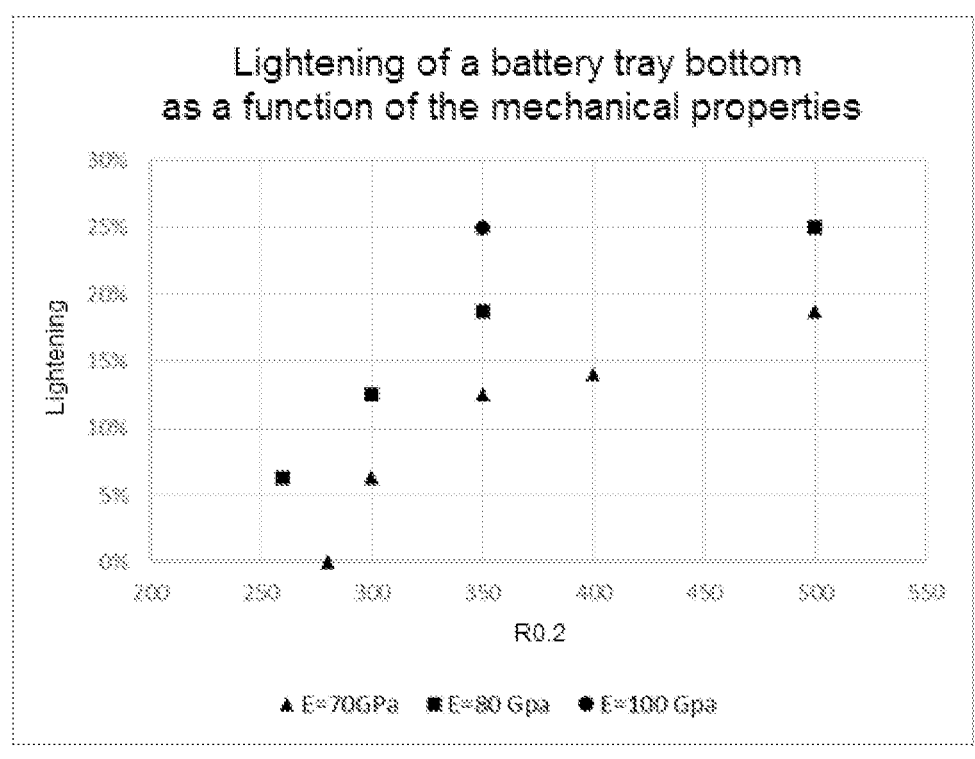

BATTERY TRAY BOTTOM FOR ELECTRIC VEHICLES

CROSS-REFERENCE TO RELATED APPLICATIONS

This application is a National Stage entry of International Application No. PCT/FR2021/051628, filed Sep. 22, 2021, which claims priority to French Patent Application No. 2009649, filed Sep. 23, 2020, and French Patent Application No. 2104966, filed May 11, 2021, the entire contents of each of which are incorporated herein by reference.

BACKGROUND

Field of the Invention

The present invention relates to the field of vehicles with an electric motor or with a hybrid motor.

More particularly, the present invention relates to the battery trays of such a vehicle with an electric motor or with a hybrid motor, consisting of a peripheral frame having a generally polygonal shape in a plan view, a bottom connected to the lower surface of the peripheral frame and made of aluminum alloy, as well as an upper cap for closure.

DESCRIPTION OF RELATED ART

A battery tray or battery tray may comprise a chamber housing electrical energy is storage cell element units, allowing producing the electrical energy used for the operation of the electric or hybrid vehicle. The electrical energy storage cell element units are placed in the battery tray, after which the battery tray is mounted on board a vehicle with an electric or hybrid motor.

A vehicle with an electric motor or a hybrid vehicle (a vehicle with an electric motor that also has an internal combustion engine) requires a large number of batteries to run a motor. The references EP 1939026, US 2007/0141451, US 2008/0173488, US 2009/0236162 and EP 2623353 give a few examples of conventional battery trays for electric vehicles.

A battery tray must protect the battery cells used to store electrical energy. In particular, in the event of an accident, this protection must avoid a short-circuit causing a complete breakdown of the vehicle. A battery tray must also have a Faraday cage function to avoid electromagnetic radiations.

Consequently, a battery tray should have sufficient mechanical characteristics to protect the modules in the event of impacts due to a collision. CN106207044 discloses a battery tray made of a carbon fiber composite material, formed by intermediate layers of carbon fibers and laminated PVC foam and side impact resistance performances. CN205930892 discloses a utility model which involves a honeycomb baffle structure instead of the bottom portion in order to improve safety performances in the event of a collision. EP2766247 suggests using trays and a free deformation space between the side wall of the battery subcompartment and the longitudinal beam of the body of the vehicle.

The patent application CN108342627 discloses a battery tray for an electric vehicle made from the following raw materials, expressed in parts by weight: 0.4-0.9 part iron, 0.5-0.8 part titanium, 0.7-1.3 parts zinc, 0.2-0.6 parts silicon, 3-6 parts nickel, 4-8 parts copper, 1-3 parts manganese, 80-90 parts aluminum, 0.2-0.6 part boron carbide, 0.8-1 part chromium oxide, 0.2-0.25 part magnesium oxide, 0.2-0.5 part silicon oxide, 0.2-0.5 part titanium oxide, 0.2-0.5 part yttrium oxide, 0.02-0.05 part beryllium carbide, 0.02-0.05 part zirconium carbide and 0.02-0.05 part tungsten carbide.

The patent application CN107201464 discloses an electric automobile battery tray made, by weight, from 0.4-0.9 parts iron, 0.5-0.8 parts titanium, 0.7-1.3 part zinc, 0.2-0.6 part silicon, 0.1-0.15 part titanium, 3-6 parts nickel, 4-8 parts copper, 1-3 parts manganese and 80-90 parts aluminum.

The patent application CN107760162 discloses a high-strength and corrosion-resistant battery tray for a passenger car, comprising a body, the latter being made of a high-strength alloy. The surface of the body of the battery tray is coated with a layer of corrosion-resistant coating. The aluminum alloy is prepared from the following components, in percentage by weight content: 0.21-0.47% Mn, 1.83-3.75% Cu, 0.23-0.47% Ti, 2.35-7.48% SiC, 0.13-0.54% Er and the remainder consisting of pure aluminum and trace impurities.

The patent FR2721041 relates to an aluminum alloy sheet intended for mechanical, aeronautical or space construction, characterized by the composition (by weight): Si: 6.5 to 11%, Mg: 0.5 to 0.8%, Cu: <0.3%, Fe: <0.08%, Mn: <0.5% and/or Cr: <0.5%, Sr 0.008 to 0.025%, Ti: <0.02%, Total others elements: <0.2%, the remainder being aluminum. The sheets according to this invention can be used in particular for the undersides of wings and the skin of the fuselage of aircrafts, as well as for the cryogenic tanks of rockets.

The invention of the patent application EP3384060 relates to a thin sheet for a reinforcing or automobile body structure part made of an aluminum alloy with a composition, in % by weight: Si: 10-14, Mg: 0.05-0.8, Cu: 0-0.2, Fe: 0-0.5, Mn: 0-0.5, optionally at least one element selected from among Na, Ca, Sr, Ba, Y and Li, the amount of said element, if it is selected, being 0.01-0.05 for Na, Ca, Sr, Ba, Y and 0.1-0.3 for Li, Sb: 0-0.05, Cr: 0-0.1, Ti: 0-0.2, other elements <0.05 each and <0.15 in total, the remainder being aluminum. The invention also relates to the method for manufacturing such a sheet and the use of a thin sheet made of an alloy of the 4XXX series having a silicon content of at least 10% by weight, the modulus of elasticity of which is at least 77 GPa to make a reinforcing or automobile body structure part.

According to the presentation of the Novelis company held in the context of the "Materials in car body engineering" conference on May 16, 2018 in Bad Nauheim, lightening of the battery trays is achieved with aluminum sheets with high yield strength.

According to the presentation of the Arcelor company held in the context of the "Battery systems in car body engineering" conference, Jun. 28, 2019 in Bad Nauheim, lightening of the battery trays is achieved with steels with very high yield strength.

A battery tray must also be perfectly sealed in order to prevent the penetration of fluid inside the chamber of the battery tray or the leakage of the electrolyte contained in the electrical energy storage cell elements outside of the chamber of the battery tray. In particular, a waterproof sealing is mandatory if the battery tray is fastened below the floor of the vehicle, in order to prevent the penetration of water or mud. In addition, it is necessary to provide for corrosion resistance against incoming and outcoming fluids.

In order to improve the operating performances of a vehicle, a battery tray must have a reduced weight while simultaneously offering maximum impact resistance, tight sealing, resistance to corrosion, ability to adapt to the control of temperature and an ability to accommodate as many electrical energy storage cell elements as possible.

SUMMARY

The present invention has been developed to lighten the bottom of the battery tray for vehicles with an electric or hybrid motor. The main function of this area of the tray is to protect the electrical energy storage cells and their cooling system from intrusions from the road (liquids and solids). The present invention suggests using an aluminum alloy sheet. This solution allows ensuring a good functional response, by simultaneously offering perfect sealing over a large surface (no connections necessary) and structural performance which allows limiting the intrusions of objects with high kinetic energy, as well as high stability of the performances over time (little or no change in properties over time, high structural resistance to corrosion in the concerned environment), and finally an optimized weight.

PROBLEM

The present invention aims to define metallic materials made of an aluminum alloy for battery trays having good properties against intrusion while having mechanical properties, resistance to corrosion, in particular intergranular, good behavior for the methods of assembling the battery trays.

A first object of the invention is the use of a thin sheet of aluminum alloy whose modulus of elasticity is at least 77 GPa to make a battery tray bottom.

Another object of the invention is a thin sheet of 4xxx aluminum alloy for a battery tray bottom made of an aluminum alloy whose modulus of elasticity is at least 77 GPa and whose yield strength Rp 0.2 is at least 295 MPa in the T6 condition.

Still another object of the invention is a battery tray bottom made with a thin sheet according to the invention.

Still another object of the invention is a method for manufacturing thin sheet comprising the following successive steps:
  a. Manufacture of a foundry plate, preferably by vertical semi-continuous casting,
  b. Homogenization, preferably heating at a temperature of at least 540° C. for 1.5 hours, preferably 550° C. for at least 4 hours,
  c. Hot rolling,
  d. Cold rolling with a preferred reduction rate of at least 60%,
  e. Solution treatment at a temperature of at least 500° C., then quenching, preferably coiling at a temperature from 50° C. to 100° C.

DESCRIPTION OF THE FIGURES

FIG. 1 is an exploded view of a battery tray for a vehicle with an electric or hybrid motor, in the case where the bottom is a part separate from the peripheral frame.

FIG. 2 shows the experimental setup of the penetration test.

FIG. 3 shows the numerical simulation model with the impactor.

FIG. 4 shows the stress and strain curves of the used materials.

FIG. 5 shows the weight reductions with the yield strength Rp 0.2 of the different used materials in abscissas.

DETAILED DESCRIPTION OF A PREFERRED EMBODIMENT

Unless specified otherwise, all of the indications concerning the chemical composition of the alloys are expressed as a percentage by weight based on the total weight of the alloy. The expression 1.4 Cu means that the copper content expressed in % by weight is multiplied by 1.4. The designation of the aluminum alloys is made in accordance with the regulations of The Aluminum Association, known to a person skilled in the art. The definitions of the metallurgical states are given in the European standard EN 515.

The tensile static mechanical characteristics, in other words the breaking strength Rm, the conventional yield strength at 0.2% elongation Rp 0.2, the necking elongation Ag % and the breaking elongation A %, are determined by a tensile test according to the standard NF EN ISO 6892-1, the sampling and direction of the test being defined by the standard EN 485-1.

The modulus of elasticity, also called Young's modulus, is measured according to the standard ASTM 1876.

Unless specified otherwise, the definitions of the standard EN 12258 apply. A thin sheet is a rolled product with a rectangular cross-section whose uniform thickness is comprised from 0.20 mm to 6 mm.

FIG. 1 shows a non-limiting example of a battery tray for vehicles with an electric or hybrid motor comprises a bottom 21, an external peripheral frame 22 formed so as to be positioned on an external portion of a peripheral edge of the bottom 21 and an upper heavy sheet or cap 23 placed on the peripheral frame from above. The external peripheral frame 22 is commonly connected to the bottom 21 by assembly means such as welding or gluing in order to guarantee the resistance of the assembly and sealing of the edges between the lower portion and the peripheral frame. The external peripheral frame has a primarily polygonal shape. The upper cover is assembled on the peripheral frame by assembly means like, as non-limiting examples, rivets, gluing, welding or screws. It may also be fastened hermetically. The entirety of the peripheral frame 22 and of the bottom 21 may also consist of a part obtained from the deformation of a sheet, as a non-limiting example, by stamping.

The main structural function of the bottom plate is protection against the intrusion of road objects onto the battery tray. Hence, the principle is to protect the batteries of the battery tray against damages. The Inventors have sought to identify the most suitable aluminum alloy materials for a battery tray. The typical selection criterion for defining the best materials is to obtain the greatest energy absorption for a deformation of the battery tray bottom under the effect of an impactor or the greatest intrusion force of an impactor for the same deformation of the battery tray bottom. They have proceeded in several steps: the first consisted in carrying out numerical simulations with different virtual materials. A virtual material is a material defined only by its mechanical properties without worrying about whether it could exist a priori. These mechanical properties are the modulus of elasticity, the yield strength Rp 0.2 and the stress and strain curves. The second step has consisted in defining the selected virtual materials by looking for the composition and the manufacturing process that allow obtaining the selected properties. These steps have been naturally repeated a certain number of times to obtain the most effective real materials for lightening the battery tray bottom.

Usually, increasing the yield strength Rp 0.2 of a material is a conventional means for thinning a part made with said material. Surprisingly, the Inventors have shown that it is also relevant to increase the modulus of elasticity to improve the properties of the battery tray bottoms. It is known that the modulus of elasticity and the yield strength are two independent properties and are not correlated. For a thin sheet of aluminum, usually, the modulus of elasticity is typically 70 GPa.

Hence, a battery tray bottom according to the invention uses a thin sheet of aluminum whose modulus of elasticity is at least 77 GPa.

In a preferred embodiment, the thin sheet used for the battery tray bottom has a modulus of elasticity of at least 79 GPa, more preferably at least 84 GPa, more preferably at least 89 GPa, more preferably at least 94 GPa, more preferably at least 99 GPa.

In one embodiment, the battery tray bottom uses a thin sheet made of an aluminum alloy of the 4xxx series whose Si content is at least 10%.

In one embodiment, the battery tray bottom uses a thin sheet of aluminum alloy whose yield strength Rp 0.2 after shaping at the battery tray bottom and after heat treatment of the battery tray bottom is at least 295 MPa, preferably at least 315 MPa, preferably at least 320 MPa, more preferably at least 330 MPa, more preferably at least 340 MPa, more preferably at least 350 MPa, more preferably at least 370 MPa, more preferably at least 380 MPa, more preferably at least 390 MPa, more preferably at least 400 MPa.

Another aspect of the invention is a thin sheet of 4xxx aluminum alloy for a battery tray bottom made of an aluminum alloy whose modulus of elasticity is at least 77 GPa and whose yield strength Rp 0.2 is at least 295 MPa in the T6 condition.

In one embodiment, the composition of the 4xxx alloy of the thin sheet is, in % by weight:

Si: 10-14,

Mg: 0.05-0.8,

Cu: 0.2-2.0,

Fe: <=0.5,

Mn: <=0.5, optionally at least one element selected from among Na, Ca, Sr, Ba, Y and Li, the mount of said element if selected being 0.01-0.05 for Na, Ca, Sr, Ba, Y and 0.1-0.3 for Li, Sb: <=0.05, Cr: <=0.1, Ti: <=0.2, other elements <0.05 each and <0.15 in total, the remainder being aluminum.

Preferably, the silicon content is at least 10%, preferably 10.5% and preferably 11% by weight, indeed a lower content does not generally allow reaching a sufficient modulus of elasticity. Advantageously the silicon content is at least 11.5% by weight and preferably at least 12% by weight. Preferably, the silicon content is at most 14% by weight, indeed a higher content generally does not allow reaching the desired elongation and formability properties. Advantageously, the silicon content is at most 13.5% by weight and preferably at most 13% by weight. An advantageous embodiment has a Si content from a minimum of 11% to a maximum of 13%, by weight.

Preferably, the magnesium content is at least 0.05% by weight and preferably at least 0.1% by weight, indeed a lower content generally does not allow reaching sufficient mechanical properties. Preferably, the magnesium content is at most 0.8% by weight and preferably at most 0.7%, indeed a higher content generally does not allow reaching the desired elongation and formability properties in the case of a stamped battery tray bottom. In an embodiment of the invention, the magnesium content is comprised from 0.1 to 0.3% by weight, which allows obtaining high formability of the sheet.

In another embodiment of the invention, the magnesium content is comprised from 0.3 and 0.6% by weight, which allows obtaining a higher mechanical strength while maintaining a sufficient formability.

Preferably, the copper content is at least 0.2%, preferably at least 0.25%, and at most 2.0% by weight. A low copper content of at least 0.2%, preferably at least 0.25%, more preferably at least 0.30%, more preferably at least 0.35%, more preferably at least 0.40% and at most 0.7%, is advantageous for sheets after ageing (T4 condition for example) for corrosion resistance. On the contrary, a high copper content, from a minimum of 0.5% to a maximum of 2%, is advantageous for obtaining high mechanical strength after the final heat treatment of the parts (T6 or T7 condition for example). Surprisingly, starting from a Cu content of 0.3%, $Mg_2Si$ and Q (AlMgSiCu) insoluble precipitates may form without significantly degrading the mechanical properties. These insoluble precipitates have a typical size of at least 0.1 μm, or 0.5 μm. A precipitate is insoluble if, when put into solution, it cannot be dissolved. An interesting tradeoff between formability and yield strength Rp 0.2 is obtained with a minimum content of 0.4%, preferably 0.40% and more preferably at least 0.5% and/or a maximum copper content preferably of 0.8% and more preferably of 0.7%.

Preferably, the iron content is at most 0.5% by weight. An iron content higher than 0.5% by weight could gave a detrimental effect on formability. Advantageously, the addition of an amount of iron of 0.1, preferably 0.10% to 0.3% by weight is carried out to improve mechanical strength and formability. It may be advantageous to carry out the addition of an amount of iron of 0.05, preferably 0.10% to 0.2% by weight more particularly to improve formability.

Preferably, the manganese content is at most 0.5% by weight. A manganese content higher than 0.5% by weight may have a detrimental effect on formability. In one embodiment, it is advantageous to carry out the addition of an amount of manganese comprised from 0.05 to 0.2% by weight in particular to improve formability. However, in another embodiment, no manganese is added and the manganese content is lower than 0.05% by weight.

The addition of at least one element selected from among Na, Ca, Sr, Ba, Y and Li, the amount of said element if selected being 0.01-0.05 for Na, Ca, Sr, Ba, Y and 0.1–0.3 for Li is advantageous. If the element is not selected as an addition, its content is kept less than 0.01% by weight for Na, Ca, Sr, Ba, Y and less than 0.05% by weight for Li. These elements are modifying agents which in particular allow controlling the size of the eutectic compounds containing silicon during solidification and/or modifying their structure, which has a favorable consequence on the mechanical properties, in particular formability, in particular during casting of plates with large dimensions. Strontium is the preferred modifying agent and the addition of 0.01 to 0.05% by weight of strontium is advantageous.

Preferably, the Sb content is at most 0.05% by weight. The addition of antimony is advantageous in particular to limit the presence of phosphorus in the alloy, this element adversely modifying the structure of the eutectic. In an embodiment of the invention, the antimony content is comprised from 0.01 and 0.04% by weight, however in this embodiment the addition of a modifying agent such as sodium or strontium is preference avoided.

The chromium content is at most 0.1% by weight. Advantageously, the addition of an amount of chromium comprised from 0.01 to 0.05%, preferably 0.01 to 0.03% by weight, is carried out.

The titanium content is comprised from 0 to 0.2% by weight. Advantageously, the addition of an amount of titanium comprised from 0.01 to 0.15% by weight is carried out.

In one embodiment, the thin sheet has a yield strength in the T6 condition of at least 320 MPa, more preferably at least 330 MPa, more preferably at least 340 MPa, more preferably at least 350 MPa, more preferably at least 370 MPa, more preferably at least 380 MPa, more preferably at least 390 MPa, more preferably at least 400 MPa.

Preferably, the method for manufacturing the thin sheet according to the invention includes the following successive steps.

First, the manufacture of a foundry plate of the composition required for the sheet.

Preferably, the foundry plate is made of an alloy of the 4XXX series. Preferably, this alloy contains scrap according to the standard EN 12258-3. Hence, the alloy of the foundry plate is made with raw materials which may be scrap.

We call scraps, products consisting of aluminum and/or aluminum alloys, resulting from the collection and/or recovery of metals produced at different manufacturing steps; called production scraps, or products after use, called recovery scraps.

Among production scraps, mention may be made of foundry dross, drippings, shredded scrap and turnings defined according to EN 12258-3.

Among the recovered scraps, mention may be made of chips or wastes originating from end-of-life vehicles.

Preferably, the 4XXX series alloy contains at least at least 50% by weight of scrap; more preferably at least 80% by weight.

Preferably, the 4XXX series alloy contains at least 50% by weight of recovery scrap, more preferably at least 80% by weight of recovery scrap.

Preferably, the recovered scraps are chips or wastes originating from end-of-life vehicles, preferably at least 50%, more preferably at least 80%. Such an alloy is particularly interesting because usually end-of-life vehicles, as a non-limiting example, passenger vehicles or light vehicles, vans, trucks contain many aluminum parts. Some of these end-of-life vehicles are defined by the Directive 2000/53/EC.

These aluminum parts are very diverse. These may consist of parts such as heat exchangers, as non-limiting examples, like air-conditioning condensers and evaporators, engine cooling or passenger compartment heating radiators, charge air coolers, oil radiators and exchangers, fuel coolers. These may also consist of engine parts, as non-limiting examples, like cylinder heads, crankcases or engine blocks. These also consist of other molding parts, as non-limiting examples, parts for suspensions. These parts contain silicon-filled alloys. This is the case of the aforementioned brazed heat exchangers. This is the case of the other parts listed before which are obtained by molding for which the alloys of the 4xxx series are usually used and which serve as a recycling branch for brazed heat exchangers. Yet, the switch from combustion engine propulsion to electric propulsion will destabilize this recycling branch. Sheets made of aluminum alloy in vehicles, in particular for bodywork and structural parts, are in the prior art in 5xxx and 6xxx alloys which are not suitable for significant recycling of 4xxx series alloys given their composition.

Hence, the thin sheet according to the invention allows creating a recycling branch for end-of-life vehicles which will allow reducing the use of aluminum originating is from electrolysis plants. Preferably, the 4xxx alloy of the thin sheet according to the invention contains chips or wastes of aluminum alloys, preferably chips or wastes originating from vehicles in use, preferably at least 50%, more preferably at least 80%.

The best electrolysis plants, which use hydroelectricity, have a carbon footprint of 4 tons of $CO_2$ equivalent ($CO_{2\ eq}$) per ton of foundry plate taking into account the use of carbon anodes. The typical carbon footprint for one ton of aluminum foundry plate produced in Europe is just under 7 tons of $CO_{2\ eq}$. The carbon footprint of one ton of foundry plate obtained with only recycled aluminum alloys is in the range of 0.5 t of $CO_2$ eq per foundry plate.

Given the diversity of alloys from chips and wastes from end-of-life vehicles, it is not always possible to make a foundry plate exclusively with chips and wastes from end-of-life vehicles. It is necessary to use primary metal ingots and additive metals to obtain the composition required for the sheet according to the invention. Given these additions, the carbon footprint of a foundry plate according to the invention is preferably lower than 4 tons of $CO_{2\ eq}$ per ton of foundry plate, preferably lower than tons of $CO_{2\ eq}$ per ton of foundry plate, preferably lower than 1 ton of $CO_{2\ eq}$ per ton of foundry plate, more preferably from 1 to 0.5 t of $CO_{2\ eq}$ per ton of foundry plate, more preferably lower than 0.5 ton of $CO_{2\ eq}$ per ton of foundry plate.

The tonnages of $CO_{2\ eq}$ contain not only the $CO_2$ produced by the aforementioned operations, but also the tonnage of the other greenhouse gases produced for their equivalent tonnage in $CO_2$.

Preferably, casting of the foundry plate is carried out by vertical semi-continuous casting.

Preferably, the foundry plate is then scalped to remove the cortical layer.

Afterwards, the foundry plate is homogenized preferably at a temperature of at least 540° C. for 1.5 hours, preferably 550° C. for at least 4 hours.

Afterwards, the foundry plate is hot rolled to a preferred thickness of 3 to 10 mm Then, a cold rolling is carried out with a preferred reduction rate of at least 60% to obtain the thickness of the thin sheet. In one embodiment, the cold rolling is carried out in two steps separate by annealing in order to avoid the apparition of edge cracks which could cause a break-up of the thin sheet.

Afterwards, the thin sheet is placed in solution and then quenched. The dissolution is carried out at a temperature of at least 500° C., preferably at least 540° C. for at least 30 s, preferably at least 1 minute. Quenching takes place in water or air with a rate of at least 1° C./s, preferably 5° C./s. Afterwards, the thin sheet is preferably coiled at a temperature of 50 to 100° C., preferably 60 to 80° C., then the coil cools down naturally to room temperature of 10 to 35° C. Instead of this coiling, it is also possible to subject the thin sheet to a heat treatment of 8 hours at 85° C. This step is useful when the part made with sheet, in particular by stamping, is painted. Indeed, this step acts as a pre-temper which, during baking of the paints, at 180° C. for 20 minutes, will allow improving the structural hardening of the thin sheet preferably to obtain a T6 condition.

In a first embodiment, the thin sheet, preferably in the T4 condition, is then optionally cut, optionally shaped, for example by stamping, to obtain a part which is preferably a battery tray bottom or a battery tray bottom with a peripheral frame, optionally a portion of said peripheral frame.

Afterwards, the thin sheet or the part obtained is heat-treated preferably to obtain a T6 condition, typically by tempering at a temperature from 200 to 250° C. for a period from 15 to 150 minutes.

The yield strength of the thin sheet in the T6 condition and/or of the material of the battery tray bottom obtained with this thin sheet is at least 295 MPa, preferably at least 315 MPa, preferably at least 320 MPa, more preferably at least 330 MPa, more preferably at least 340 MPa, more preferably at least 350 MPa, more preferably at least 370 MPa, more preferably at least 380 MPa, more preferably at least 390 MPa, more preferably at least 400 MPa.

In a second embodiment, the thin sheet is in a T6x condition obtained by under-tempering the sheet by a treatment at 100° C. to 150° C., preferably at 120° C. to 140° C., for 5 to 15 hours, preferably from 7 to 9 hours. Afterwards, the sheet is optionally to cut, optionally shaped, for example by stamping, to obtain a part which is preferably a battery tray bottom or a battery tray bottom with a peripheral frame, optionally a portion of said peripheral frame. Afterwards, said part is painted, the painting step includes baking the paints at 180° C. for 20 minutes.

Surprisingly, the Inventors have noticed that the thin sheet or the battery tray bottom obtained with this thin sheet resists corrosion, despite the presence of copper in the alloy, for use on a vehicle, in particular an electric vehicle. The resistance to intergranular corrosion, measured according to the standard ISO 11846, of the thin sheet in the T6 condition and/or of the material of the battery tray bottom obtained with the thin sheet, in particular but not exclusively in the T4 condition, in the T6 condition or in the T6x condition, is, after an additional ageing of 40 minutes at 195° C. or an ageing of 1,000 hours at 130° C., at most a maximum depth of 400 µm, preferably 300 µm or at most an average depth of 350 µm, preferably 250 µm.

EXAMPLES

A specific penetration test has been designed to assess the resistance to penetration of the bottom 21. To assess the resistance to penetration of the sheet material, two critical configurations on the bottom sheet 21 can be used, which form a near penetration and a far penetration of the external peripheral frame. Proximate to the frame, the mechanical system is rigid and enables only a slight deformation of the sheet during the penetration. In this manner, the fracture of the material is the dominant damage mechanism. In a central position, away from the frame, the system behaves elastically. It could be the site of elastic and plastic deformations, leading to a high risk of contact of the sheet with the battery modules. The test may be performed on a Zwick 400 static load testing machine. As shown in FIG. 2, the sheet 13 is clamped between an upper steel frame and a lower steel frame 11 with a 30 mm width and fastened by means of several screws 12. A 19.6 mm in diameter cylindrical mandrel with rounded edges (r=1.5 mm) is fastened on the machine to perform a penetration in the sheet. The force applied to the mandrel as well as its displacement are measured. The frame can move so as to control two positions amongst the same central reference 1 and angular reference 4 positions of the sheet. The total movement of the mandrel during the test is set at a distance of 15 mm selected to represent a typical space between the bottom 21 and the batteries. The test is performed under quasi-static conditions.

The above-described intrusion test requires having a material to be tested. Hence, the Inventors have initially sought to identify the most promising materials for lightening a battery tray bottom. Hence, the Inventors have defined the properties of virtual materials in order to identify the most promising ones in order to lighten the mass of a battery tray bottom. The properties of the virtual materials are modulus of elasticity, the yield strength, and the stress and strain curves. These data are summarized in Tables 1 and 2 and in FIG. 4 for the stress and strain curves. The material called A0 is not virtual: it consists of an aluminum alloy AA6111, well known for the manufacture of car body. The properties retained for this AA6111 alloy are those of a stamped sheet after baking treatment of the paints ("Bake hardening").

These different properties of the materials have been used in numerical simulation to study their resistance to intrusion using a simplified battery tray bottom. The numerical simulation software is LS-Dyna. The simplified battery tray bottom is a 350*600 mm sheet. The mesh for the simulation uses elements with a length of 2.5 mm, "fully integrated shell element" with 5 integration points in the thickness. The boundary conditions for the numerical simulation have two characteristics. The first one is a 30 mm wide strip at 20 mm inside the sheet starting from the edge, where only translations in the plane of the sheet and the rotation around the vertical axis are authorized. A second characteristic is the presence of 16 areas with a 10 mm diameter distributed around the sheet to represent the screw areas, where all translations and all rotations blocked on the nodes The plane of FIG. 2 shows this strip and these 16 areas.

The primary structural function of the bottom plate is intrusion protection against road objects projected onto the battery tray. Hence, the principle is to protect the batteries of the battery case against damages.

The numerical approach is the simulation of the quasi-static intrusion test, with a spherical impactor with a 150 mm diameter. The Inventors used a 150 mm diameter spherical impactor rather than a 19.6 mm diameter cylindrical mandrel with rounded edges because it is closer to a real object that might hit the battery tray in reality. The simulation is performed up to a displacement of the punch by 15 mm at the center of the sheet at constant speed and the reaction force on the punch is calculated. The curves between the different material options are compared.

As shown by Table 2 and graphically by FIG. 5, the increase in the yield strength Rp 0.2 allows lightening the battery tray bottom by thinning it by 6% to 19% with an aluminum alloy material with a modulus of elasticity of 70 GPa. The use of a sheet having a modulus of elasticity of 80 GPa instead of 70 GPa enables an additional is thinning of the sheet typically by 6% with the same yield strength Rp 0.2 as shown in Table 3. In the case of Examples A0 and A10 of Table 3, the modulus of elasticity of 80 GPa instead of 70 GPa allows compensating for the reduction in the yield strength from 280 to 260 MPa. Similarly, increasing the modulus of elasticity from 80 to 100 GPa with the same yield strength Rp 0.2 allows further improving thinning typically by 6%, as shown in Examples A6 and A8 of Table 3.

TABLE 1

| A1, A9 | | A2 | | A3 | | A0 | | A4, A6, A8 | | A7 | | A10 | |
|---|---|---|---|---|---|---|---|---|---|---|---|---|---|
| strains [—] | stresses [MPa] | strains [—] | stresses [MPa] | strains [—] | stresses [MPa] | strains [—] | stresses [MPa] | strains [—] | stresses [MPa] | strains [—] | stresses [MPa] | strains [—] | stresses [MPa] |
| 0.000 | 280 | 0.000 | 380 | 0.000 | 300 | 0.000 | 277 | 0.000 | 330 | 0.000 | 480 | 0.000 | 255 |
| 0.001 | 296 | 0.001 | 397 | 0.001 | 302 | 0.001 | 278 | 0.001 | 346 | 0.001 | 497 | 0.001 | 257 |
| 0.002 | 301 | 0.002 | 402 | 0.002 | 304 | 0.002 | 279 | 0.002 | 350 | 0.002 | 501 | 0.002 | 258 |
| 0.002 | 303 | 0.002 | 405 | 0.002 | 305 | 0.002 | 279 | 0.002 | 353 | 0.002 | 504 | 0.002 | 258 |
| 0.003 | 306 | 0.003 | 408 | 0.003 | 306 | 0.003 | 280 | 0.003 | 355 | 0.003 | 507 | 0.003 | 259 |
| 0.004 | 313 | 0.004 | 415 | 0.004 | 310 | 0.004 | 282 | 0.004 | 362 | 0.004 | 514 | 0.004 | 262 |
| 0.006 | 321 | 0.006 | 424 | 0.006 | 317 | 0.006 | 285 | 0.006 | 370 | 0.006 | 522 | 0.006 | 265 |
| 0.010 | 331 | 0.010 | 434 | 0.010 | 326 | 0.010 | 289 | 0.010 | 379 | 0.010 | 532 | 0.010 | 271 |
| 0.016 | 342 | 0.016 | 446 | 0.016 | 342 | 0.016 | 297 | 0.016 | 390 | 0.016 | 544 | 0.016 | 279 |
| 0.025 | 355 | 0.025 | 460 | 0.025 | 365 | 0.025 | 308 | 0.025 | 402 | 0.025 | 557 | 0.025 | 290 |
| 0.040 | 369 | 0.040 | 474 | 0.040 | 397 | 0.040 | 324 | 0.040 | 416 | 0.040 | 572 | 0.040 | 304 |
| 0.063 | 383 | 0.063 | 490 | 0.063 | 438 | 0.063 | 345 | 0.063 | 430 | 0.063 | 586 | 0.063 | 319 |
| 0.100 | 397 | 0.100 | 505 | 0.100 | 484 | 0.100 | 370 | 0.100 | 443 | 0.100 | 601 | 0.100 | 334 |
| 0.150 | 408 | 0.150 | 517 | 0.150 | 519 | 0.150 | 391 | 0.150 | 454 | 0.150 | 613 | 0.150 | 344 |
| 0.200 | 415 | 0.200 | 524 | 0.200 | 537 | 0.200 | 403 | 0.200 | 461 | 0.200 | 620 | 0.200 | 347 |
| 0.250 | 420 | 0.250 | 529 | 0.250 | 546 | 0.250 | 410 | 0.250 | 465 | 0.250 | 624 | 0.250 | 349 |
| 0.300 | 423 | 0.300 | 532 | 0.300 | 550 | 0.300 | 414 | 0.300 | 469 | 0.300 | 628 | 0.300 | 350 |
| 0.400 | 427 | 0.400 | 537 | 0.400 | 553 | 0.400 | 417 | 0.400 | 473 | 0.400 | 632 | 0.400 | 350 |
| 0.500 | 430 | 0.500 | 540 | 0.500 | 554 | 0.500 | 417 | 0.500 | 475 | 0.500 | 635 | 0.500 | 350 |
| 0.600 | 431 | 0.600 | 541 | 0.600 | 554 | 0.600 | 418 | 0.600 | 477 | 0.600 | 636 | 0.600 | 350 |
| 0.700 | 432 | 0.700 | 542 | 0.700 | 554 | 0.700 | 418 | 0.700 | 478 | 0.700 | 637 | 0.700 | 350 |
| 0.800 | 433 | 0.800 | 543 | 0.800 | 554 | 0.800 | 418 | 0.800 | 478 | 0.800 | 638 | 0.800 | 350 |
| 0.900 | 434 | 0.900 | 544 | 0.900 | 554 | 0.900 | 418 | 0.900 | 479 | 0.900 | 639 | 0.900 | 350 |
| 1.000 | 434 | 1.000 | 544 | 1.000 | 554 | 1.000 | 418 | 1.000 | 479 | 1.000 | 639 | 1.000 | 349 |

TABLE 2

| | | E (Gpa) | R0.2 (Mpa) | Thickness | Lightening |
|---|---|---|---|---|---|
| | A0 | 70 | 280 | 3.2 | 0% |
| | A1 | 70 | 300 | 3 | 6% |
| | A2 | 70 | 400 | 2.75 | 14% |
| | A3 | 70 | 300 | 3 | 6% |
| | A4 | 70 | 350 | 2.8 | 13% |
| | A5 | 70 | 500 | 2.6 | 19% |
| invention | A6 | 80 | 350 | 2.6 | 19% |
| invention | A7 | 80 | 500 | 2.4 | 25% |
| invention | A8 | 100 | 350 | 2.4 | 25% |
| invention | A9 | 80 | 300 | 2.8 | 13% |
| invention | A10 | 80 | 260 | 3 | 6% |

TABLE 3

| | E (Gpa) | R0.2 (Mpa) | Thickness | Lightening compared to A0 | Effect of the increase in the modulus of elasticity |
|---|---|---|---|---|---|
| A0 | 70 | 280 | 3.2 | 0.0% | |
| A10 | 80 | 260 | 3 | 6.3% | 6.3% |
| A3 | 70 | 300 | 3 | 6.3% | |
| A9 | 80 | 300 | 2.8 | 12.5% | 6.3% |
| A4 | 70 | 350 | 2.8 | 12.5% | |
| A6 | 80 | 350 | 2.6 | 18.8% | 6.2% |
| A6 | 80 | 350 | 2.6 | 18.8% | |

TABLE 3-continued

| | E (Gpa) | R0.2 (Mpa) | Thickness | Lightening compared to A0 | Effect of the increase in the modulus of elasticity |
|---|---|---|---|---|---|
| A8 | 100 | 350 | 2.4 | 25.0% | 6.3% |
| A5 | 70 | 500 | 2.6 | 18.8% | |
| A7 | 80 | 500 | 2.4 | 25.0% | 6.3% |

The recycling center in the Neuf Brisach plant currently has a carbon footprint lower than 0.3 t $CO_{2\ eq}$/t.

Foundry plates have been cast by vertical semi-continuous casting with the composition according to Table 4, then scalped to remove the cortical layer.

TABLE 4

| | Si % | Fe % | Cu % | Mn % | Mg % | Cr % | Ti % | Sr % |
|---|---|---|---|---|---|---|---|---|
| A | 12.9 | 0.27 | 0.10 | 0.11 | 0.55 | 0.02 | 0.05 | 0.03 |
| B | 12.2 | 0.24 | 0.64 | 0.17 | 0.34 | 0.02 | 0.05 | 0.04 |
| C | 12.0 | 0.26 | 0.69 | 0.18 | 0.64 | 0.02 | 0.05 | 0.04 |
| D | 12.1 | 0.24 | 0.14 | 0.20 | 0.62 | 0.02 | 0.01 | 0.03 |
| E | 12.0 | 0.51 | 0.40 | 0.28 | 0.60 | 0.02 | 0.01 | 0.02 |

Afterwards, the foundry plates have been reheated, hot rolled, then cold rolled into thin sheets which have been solution treated and quenched according to the conditions of Table 5. Afterwards, the thin sheets A, B and C have undergone the heat treatment at 85° C. for 8 hours.

Given the apparition of edge cracks on the foundry plates D and E during the cold rolling, the cold rolling has been done in two steps separated by annealing at 350° C. for 1 hour to avoid the apparition of cracks on the thin plate.

TABLE 5

| | heating temperature (° C.) | heating duration (h) | hot rolled thickness (mm) | cold rolled thickness (mm) | cold shrinkage (%) | dissolution temperature (° C.) | dissolution duration (s) | Coiling or equivalent treatment |
|---|---|---|---|---|---|---|---|---|
| A | 540 | 2 | 9 | 3.5 | 61 | 540 | 60 | 8 hours 85° C. |
| B | 540 | 4 | 7 | 2.8 | 60 | 540 | 60 | 8 hours 85° C. |
| C | 540 | 4 | 7 | 2.8 | 60 | 540 | 60 | 8 hours 85° C. |

Afterwards, the thin sheets have been subjected to a tempering heat treatment according to Table 6.

TABLE 6

| | tempering temperature (° C.) | Tempering duration (min) |
|---|---|---|
| A | 210 | 120 min |
| B | 205 | 90 min |
| C | 205 | 90 min |

The thin sheets thus obtained have been mechanically characterized in the transverse direction with respect to the rolling direction of Table 7.

TABLE 7

| | E (Gpa) | Rp0.2 (MPa) | Rm (MPa) | Ag % necking | A % breaking | n 4-6% |
|---|---|---|---|---|---|---|
| A | 80.7 | 285 | 333 | 4.8 | 8.1 | |
| B | 79.1 | 295 | 364 | 6.5 | 9 | 0.083 |
| C | 80.5 | 344 | 399 | 5.5 | 7 | 0.057 |

The thin sheets have also been characterized in terms of intergranular corrosion, measured according to the standard ISO 11846, after two ageing cycles to assess corrosion resistance during the use of the vehicle.

TABLE 8

| | IGC corrosion | | | |
|---|---|---|---|---|
| | 45 min 195° C. | | 1000 h 130° C. | |
| | max depth (μm) | average depth (μm) | max depth (μm) | average depth (μm) |
| B | 278 | 184 | 261 | 196 |
| C | 255 | 230 | 255 | 209 |

The invention claimed is:

1. A thin sheet made of 4xxx alloy for a battery tray bottom made of aluminum alloy whose modulus of elasticity is at least 77 GPa and whose yield strength Rp0.2 is at least 315 MPa in T6 condition.

2. The thin sheet according to claim 1, whose 4xxx alloy contains scrap.

3. The thin sheet according to claim 1, wherein a carbon footprint of manufacture of a foundry plate for manufacture of the thin sheet is less than 4 tons of $CO_2$ per foundry plate.

4. The thin sheet according to claim 1, comprising a composition of 4xxx alloy, in % by weight, Si: 10-14, Mg: 0.05-0.8, Cu: 0.2-2.0, Fe: <=0.5, Mn: <=0.5, optionally at least one element selected from among Na, Ca, Sr, Ba, Y and Li, the amount of said element if selected being 0.01-0.05 for Na, Ca, Sr, Ba, Y and 0.1-0.3 for Li, Sb: <=0.05, Cr: <=0.1, Ti: <=0.2, other elements <0.05 each and <0.15 in total, the remainder being aluminum.

5. The thin sheet according to claim 4, comprising insoluble Mg2Si precipitates.

6. The thin sheet according to claim 4, wherein the Si content: 11-13% by weight.

7. The thin sheet according to claim 4, wherein the Cu content is at least 0.25% by weight.

8. The thin sheet according to claim 4, wherein the Fe content is at least 0.10%.

9. The thin sheet according to claim 4, wherein the Mn content: 0.05-0.2% by weight.

10. The thin sheet according to claim 4, wherein the Mn content: <0.05% by weight.

11. The thin sheet according to claim 4, wherein the Sr content: 0.01-0.05% by weight.

12. The thin sheet according to claim 4, wherein the Cr content: 0.01-0.05% by weight and/or the Ti content 0.01-0.15% by weight.

13. The thin sheet according to claim 4, wherein the Cu content is 0.4-0.8% by weight.

14. The thin sheet according to claim 1, comprising a yield strength in T6 condition of at least 320 MPa.

15. The thin sheet according to claim 1, wherein the 4xxx alloy contains chips or wastes originating from end-of-life vehicles.

16. The thin sheet according to claim 1, wherein the 4xxx alloy contains at least 50% by weight of scrap.

17. The thin sheet according to claim 1, wherein a carbon footprint of manufacture of a foundry plate for manufacture of the thin sheet is less than 2 tons of $CO_2$ per foundry plate.

18. A battery tray bottom made with a thin sheet according to claim 1.

19. A method for manufacturing the thin sheet according to claim 1 comprising the following successively:

a. Manufacture of a foundry plate optionally by vertical semi-continuous casting,

b. Homogenization at a temperature of at least 540° C. for
1.5 hours,
c. Hot rolling,
d. Cold rolling with an optional reduction rate of at least
60%,
e. Solution treatment at a temperature of at least 500° C.,
then quenching.

20. The method for manufacturing the thin sheet according to claim 19 comprising the following successively:

a. Manufacture of the foundry plate optionally by vertical
semi-continuous casting,
b. Homogenization at a temperature of at least 550° C. for
at least 4 hours,
c. Hot rolling,
d. Cold rolling with an optional reduction rate of at least
60%,
e. Solution treatment at a temperature of at least 500° C.,
then quenching, and coiling at a temperature from 50°
C. to 100° C.

\* \* \* \* \*